Jan. 19, 1926. 1,570,119
W. M. BAXTER
REMOVABLE BODY TRUCK
Filed Jan. 2, 1923   2 Sheets-Sheet 2
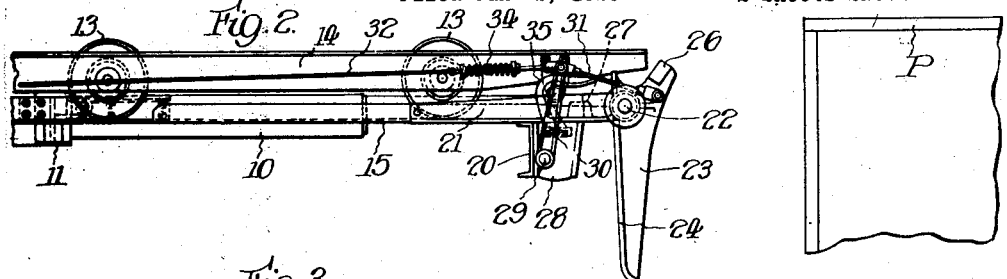
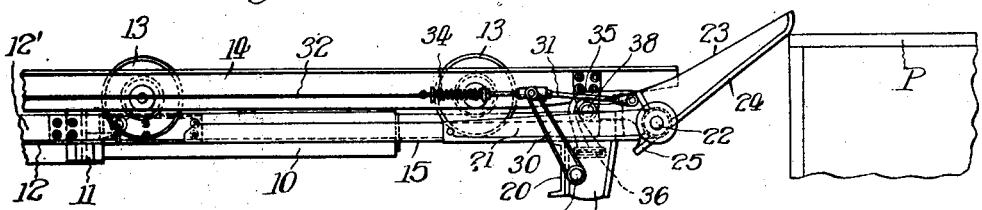
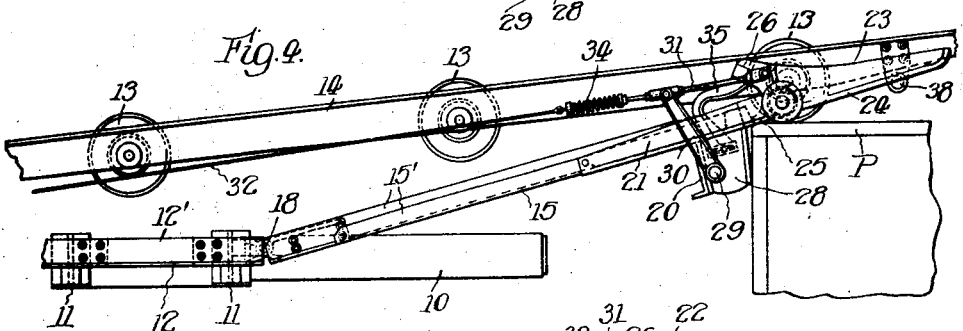
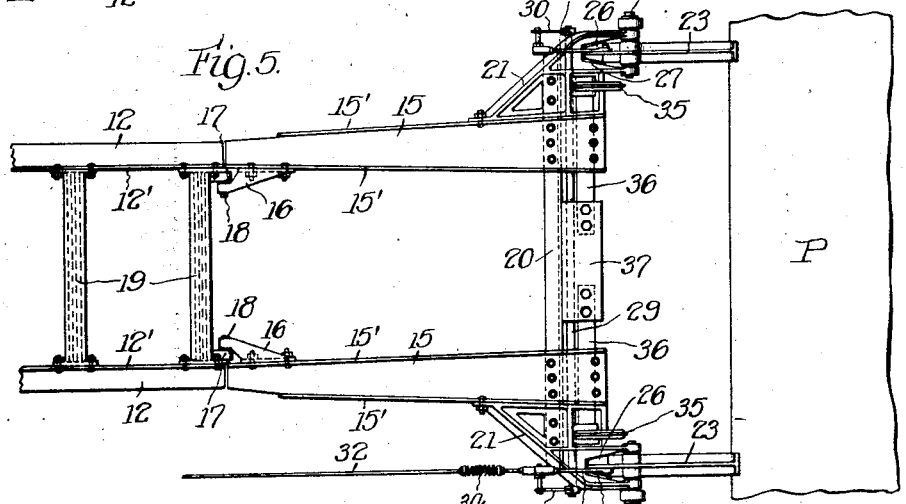
Inventor:
William M. Baxter,
By Ira J. Wilson Atty.
Witness
A. J. Sauser Patented Jan. 19, 1926.

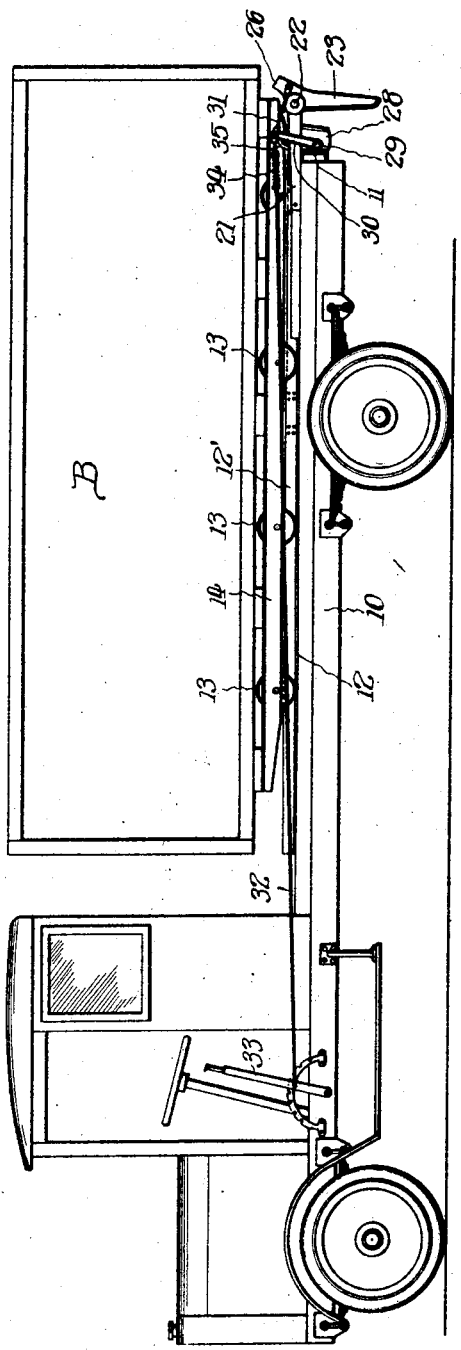

1,570,119

UNITED STATES PATENT OFFICE.

WILLIAM M. BAXTER, OF CHICAGO, ILLINOIS, ASSIGNOR TO IDEAL REMOVABLE BODY COMPANY, OF CHICAGO, ILLINOIS, A CORPORATION OF ILLINOIS.

REMOVABLE-BODY TRUCK.

Application filed January 2, 1923. Serial No. 610,245.

*To all whom it may concern:*

Be it known that I, WILLIAM M. BAXTER, a citizen of the United States, residing at Chicago, in the county of Cook and State of Illinois, have invented certain new and useful Improvements in Removable-Body Trucks, of which the following is a specification.

This invention pertains in general to trucks and similar vehicles and has reference more particularly to trucks of the removable body type, which permit the body to be loaded or unloaded in a warehouse, while the truck chassis is transporting another loaded body.

In an application filed by me on the 14th day of August, 1922, Serial No. 581,565, I have disclosed and claimed an improved removable body truck of this type; and my present invention has been designed mainly as an improvement upon the truck of my aforesaid application; although it is to be understood that the present improvement is capable of application to trucks of this type generally, and is by no means limited to its employment with the truck disclosed and claimed in the aforesaid application.

For purposes of delivering the load to a warehouse or other point of delivery, as well as taking on an empty truck body, the truck is commonly backed up against the unloading platform, and the body is transferred from the chassis onto the platform, and, when emptied, from the platform onto the chassis, by moving it endwise over rails from the chassis onto the platform, and vice versa, respectively, the body being provided with suitable wheels for this purpose. Now, it not infrequently happens that the top of the platform is a few inches, more or less, above the level of the track on the chassis body; so that, in order to unload the body in the manner described, it has heretofore been necessary to provide a temporary inclined trackway connecting the rails of the chassis body with the front edge of the platform, or else bodily lift the rear end of the body onto the platform.

One purpose of my present invention is to provide means on the chassis itself by which, when the truck is backed up to a platform which is higher than the track rails of the chassis on which the body rests, the rear end portions of the rails themselves may be elevated automatically into register with the front edge of the platform, so that the wheels of the body may readily travel thereover onto the platform, or, in the reverse direction when an empty body is being returned onto the truck chassis.

Another object of the invention is to provide a track elevating mechanism of the kind above referred to which will normally be in inoperative position and out of the way, and may be manually set to working position, and when so set, will operate automatically under a backward movement of the truck toward the platform.

Another object of the invention is to provide, in connection with the tilting mechanism, a manually actuated setting mechanism therefor which shall have an elastic and extensile character, permitting the track elevating devices to automatically accommodate themselves to the top of the platform as they pass up over the front edge of the latter, without imposing any breaking strain upon their manually actuated setting mechanism.

Other objects and advantages of my invention will be readily apparent to persons skilled in the art as the same becomes better understood by reference to the following description, when considered in connection with the accompanying drawings, wherein—

Fig. 1 is a side elevation of a truck embodying my invention;

Fig. 2 is a side elevation of the rear portion of the chassis and body truck, shown adjacent to an unloading platform whose surface is above the level of the body truck, and with the shoes in lowered or idle position;

Fig. 3 is a view similar to Fig. 2, but showing the shoes in raised position engaged with the front edge of the platform;

Fig. 4 is a view similar to Figs. 2 and 3, but showing the truck backed up to unloading position, with the pivoted track sections elevated and engaged with the front edge of the platform, and the body truck partially advanced onto the unloading platform; and Fig. 5 is a top plan view of the parts as they are shown in Fig. 3.

Referring to the drawings more in detail, reference character 10 indicates the side members of the chassis frame which are rigidly connected at spaced intervals by tie bars 11 indicated in Figs. 2, 3 and 4. Upon the chassis frame there is rigidly mounted a longitudinally extending track consisting of rails 12 which are preferably of angle shape, their upturned flanges 12' forming a guard which prevents lateral displacement of the wheels 13 of the body truck 14 that travel on the said rails. The rear portion of each rail consists of a flared or longitudinally tapered section 15 of considerable width at its rear end to accommodate the wheels 13 of the body and guide the latter onto the chassis even though the truck wheels be not accurately aligned with the main portion of the track. In moving the truck body onto the chassis the flared portions 15 of the track will receive the wheels, and the guard flanges 15' thereof, which are preferably provided on both sides of the rail section, will guide the wheels so that as the body is moved onto the chassis it will become aligned therewith and disposed squarely upon the track rails. The rail sections 15 are pivotally connected to the main rails 12 so as to be capable of swinging upwardly from a horizontal plane on hinges formed of apertured brackets 16 and 17 strongly secured to the inner sides of the rails 15 and 12 and hinge bolts 18 connecting said brackets, all as clearly shown in Fig. 5. The rails 12 may be rigidly spaced in parallel relation by tie bars 19 (Fig. 5).

For moving the truck body off and onto the chassis, the under side of the body may be equipped with a longitudinal rack, and the chassis with a pinion and driving mechanism therefor; the pinion being so mounted as to follow rising movements of the rack and thereby maintain its engagement with the latter. Operating mechanism of this character is fully disclosed and claimed in my aforesaid pending application; and since it constitutes no part of my present invention, it is not shown herein. For the purposes of moving the body off and onto the truck chassis, any suitable mechanism may be employed, or the body may be pushed off and on manually, so far as the present invention is concerned.

In Figs. 2 to 5 inclusive I have indicated an unloading platform P, against which the loaded truck is backed to discharge its load. In these views it will be observed that the top surface of the platform is somewhat higher than the track rails of the chassis; and it is therefore necessary to elevate the rear end of the body, which is designated by the reference character B in Fig. 1 and its truck, in discharging the same onto the platform. My present invention comprehends means mounted on and carried by the truck chassis itself for effecting this result in co-operation with the tiltable rear track sections 15; which means are normally in idle position when the truck is on the road, but may, by the driver, be readily shifted into operative position relatively to the unloading platform as the truck is backed up to the latter.

Turning now to a description of this mechanism, strongly bolted to and transversely of, beneath the rear hinged rail sections 15 is a transverse member, herein shown as a channel beam 20, the same projecting some distance beyond the outer sides of the rail sections. Rigidly bolted to the outer sides of the rear rail sections and to the projecting ends of the channel beam 20 are a pair of brackets 21, each having a forked rear end in which is hinged on a pivot bolt 22 a shoe designated in its entirety by 23. This shoe has a broad flat sole 24 lying rearwardly of the pivot axis of the shoe, a heel 25 continuous with the sole and lying forwardly of the pivot axis, and, above the heel 25, a stop lug 26. On the upper face of the rear portions of each bracket 21 is an abutment block or anvil 27, on which the stop lug 26 of the shoe comes to rest when the shoe has been tilted to a platform engaging position as shown in Figs. 3 and 5.

Describing next the mechanism shown for manually swinging the shoes 23 to and from working position, bolted to the rear sides of the channel beam 20 are a pair of brackets 28, in and between which is journaled a rock shaft 29, best shown in Fig. 5. On the projecting ends of this rock shaft are mounted a pair of upstanding arms 30, the upper ends of which are pivotally connected by links 31 with shoes 23 at points above the pivot axis of the latter. Also pivotally connected to the upper end of one of the arms 30 is an operating rod 32 that extends forwardly along one side of the chassis and is connected to an operating lever 33 (Fig. 1) within convenient reach of the driver. In this rod 32 is interposed an elastic section 34, herein shown as a compression coil spring, for a purpose hereinafter described.

For the purpose of yieldingly arresting the final forward movement of the body onto the chassis, and for the further purpose of holding down the rear end of the body so that it cannot be disengaged from the chassis, but at the same time may be permitted a limited degree of flexibility, there is mounted at the rear end of the chassis frame and at each side thereof a hold-down hook 35. Each of these hooks is mounted upon the outer end of a leaf spring 36 secured at its inner end to a bracket 37 that is attached to the end sill 20 of the chassis frame. Each hook projects upwardly through an aperture in the bracket 21, and lies in the path of a laterally extending lug 38, preferably equipped with a roller, on the side frame member 14 of the body truck. These lugs automatically engage with the hooks as the truck body reaches the limit of its travel onto the chassis, thereby providing a braking action which slows down the movement of the body and brings it gently to rest without objectionable shocks and jars. These hooks serve also, when the truck is in transit, to yieldingly hold down the rear end of the body, thereby preventing disengagement or displacement of the body from the chassis; but permitting a limited and desirable degree of flexibility between the body and the chassis. This body braking and holding mechanism last above described is not claimed herein, but constitutes in part the subject matter of my aforesaid application.

In the operation of the apparatus, the driver backs the loaded truck up to within a short distance of the platform, and then throws the lever 33 forwardly, thereby swinging the shoes 23 upwardly to the position indicated in Fig. 3. The truck is then backed further toward the platform, during which movement the shoes 23, ride up over the front edge of the platform, and raise the rear rail sections 15 to a point at which their rear ends are substantially flush with and come to rest on the front edge of the platform, the shoes thus acting as sliding cams to raise both the rail sections and the rear end of the truck body. The rail sections 15 thus constitute skids, over which the body truck is caused to travel off the chassis truck by suitable manipulation of the unloading mechanism (not shown); or, where the truck may not be equipped with unloading mechanism, the body may be drawn off the chassis by suitable mechanism on the platform itself. As soon as the shoes 23 have advanced on the platform to a point where their pivot axis passes the front edge of the platform, thereby bringing the heels 25 into engagement with the latter, the shoes rock downwardly to a position substantially parallel with the inclined rail sections 15 as shown in Fig. 4, the spring 34 yielding to permit this action without the necessity of throwing back the lever 33.

After the empty truck body has been returned onto the truck chassis, and the driver starts away from the platform, he retracts the lever 33 to the position shown in Fig. 1, which permits the shoes 23 to drop to a position in which they underlie the rear end of the truck body and are out of the way.

It is believed that the foregoing description, in connection with the drawings, will make clear to persons skilled in the art the construction, mode of operation and advantages of the invention. Manifestly various changes in structural detail may be resorted to without departing from the principle of the invention or sacrificing any of the advantages thereof, and hence I reserve all such variations and modifications as fall within the spirit and purview of the appended claims.

I claim—

1. In a removable body truck, the combination of a chassis frame, and a track thereon, said track including a rear pivoted section adapted to be automatically elevated into engagement with the front edge of a platform upon engagement of said section with said platform and constituting a skid for the travel of the truck body between said chassis frame and platform.

2. In a removable body truck, the combination of a chassis frame, a pair of track rails mounted on said chassis frame, and a pair of rail sections aligned with and pivotally jointed to the rear ends of said rails, said pivoted rail sections adapted to be automatically raised into engagement with the front edge of the platform upon engagement of said section with said platform and constituting skids for the travel of the truck body between said chassis frame and platform.

3. In combination, a truck having a chassis and a removable body thereon, means to load and unload said body from and to a platform adjacent said chassis, and means irrespective of the position of the truck with regard to the platform to automatically engage said platform to position said body with respect thereto upon backward movement of said truck toward said platform.

4. The combination with a vehicle having means to bodily load and unload a cargo thereon and therefrom respectively, of means to position said load with respect to a platform for loading and unloading operations, and means adapted to engage the platform upon rearward movement of said vehicle and operative automatically upon engagement with said platform to operate said positioning means.

5. In a removable body truck, the combination of a chassis frame provided with a pivoted track, and means attached to said track and co-operating with a platform for elevating the rear ends of said track onto said platform under a backward travel of said truck toward the latter.

6. In a removable body truck, the combination of a chassis frame provided with a pivoted track, and means pivotally attached to the rear end of said track adapted to be swung upwardly to a position to engage with the front edge of a platform for elevating the rear end of said track onto said platform under a backward travel of said truck toward the latter.

7. In a removable body truck, the combination of a chassis frame provided with a pivoted track, a pair of shoes pivotally suspended from the rear end of said track, means for swinging said shoes to an upwardly and rearwardly inclined position wherein they are adapted to engage the front edge of a platform, and means for limiting the upward swing of said shoes, whereby, under a backward travel of said truck toward said platform, the rear end of said track is elevated onto the latter.

8. In a removable body truck, the combination of a chassis frame provided with a pivoted track, a pair of shoes pivotally suspended from the rear end of said track, said shoes having flat soles extending both forwardly and rearwardly of their pivot axis, means for swinging said shoes to an upwardly inclined position wherein they are adapted to slidably engage the front edge of a platform, and co-operating stops for limiting the upward swing of said shoes, whereby, under a backward travel of said truck toward said platform, the rear end of said track is elevated onto the latter.

9. In a removable body truck, the combination of a chassis frame, a pair of track rails mounted on said frame, a pair of rail sections aligned with and pivotally jointed to the rear ends of said rails, and means attached to said pivoted rail sections and co-operating with the platform for elevating the rear ends of said rail sections onto said platform under a backward travel of said truck toward the latter.

10. In a removable body truck, the combination of a chassis frame, a pair of track rails mounted on said frame, a pair of rail sections aligned with and pivotally jointed to the rear ends of said rails, and means pivotally suspended from the rear ends of said pivoted rail sections adapted to be swung upwardly to a position to engage with the front edge of a platform for raising the rear ends of said pivoted track sections onto the latter under a backward travel of said truck toward said platform.

11. In a removable body truck, the combination of a chassis frame, a pair of track rails mounted on said frame, a pair of rail sections aligned with and pivotally jointed to the rear ends of said rails, a pair of shoes pivotally suspended from the rear ends of said pivoted rail sections, means for swinging said shoes to an upwardly and rearwardly inclined position wherein they are adapted to engage a front edge of a platform, and means for limiting the upward swing of said shoes, whereby, under a backward travel of said truck toward said platform, said shoes act to cam the rear ends of said pivoted track sections upwardly onto said platform.

12. In a removable body truck, the combination of a chassis frame, a pair of rail sections pivotally connected at their forward ends to said frame, brackets secured to said rail sections, and shoes mounted on said brackets adapted to co-operate with the edge of an unloading platform under a backward movement of said truck to elevate the rear ends of said rail sections onto said platform.

13. In a removable body truck, the combination of a chassis frame, a pair of rail sections pivotally connected at their forward ends to said frame, brackets secured to the rear ends of said rail sections, shoes pivotally suspended from said brackets, manually operable means for swinging said shoes upwardly to platform engaging position, and co-operating stop members on said brackets and shoes limiting the upward swing of the latter.

14. In a removable body truck, the combination of a chassis frame, a pair of rail sections pivotally connected at their forward ends to said frame, a transverse member rigidly connecting the rear ends of said rail sections, brackets secured to said rail sections and transverse member, shoes pivotally suspended from said brackets, manually operable means for swinging said shoes upwardly to platform engaging position, and co-operating stop members on said brackets and shoes limiting the upward swing of the latter.

15. In a removable body truck, the combination of a chassis frame, a pair of rail sections pivotally connected at their forward ends to said frame, a transverse member rigidly connecting the rear ends of said rail sections, brackets secured to said rail sections and transverse member, shoes pivotally suspended from said brackets, a rock shaft mounted on said transverse member, arms on the ends of said rock shaft, links connecting said arms to said shoes, and a pull rod connected to one of said arms for rocking said shaft and thereby elevating said shoes to platform engaging position.

16. In a removable body truck, the combination of a chassis frame, a pair of rail sections hinged at their forward ends to said frame, a transverse member rigidly connecting the rear ends of said rail sections and projecting beyond the outer sides of the latter, brackets secured to said rail sections and the projecting portions of said transverse member, shoes pivotally suspended from said brackets, a rock shaft mounted on and parallel with said transverse member, upwardly extending arms on the ends of said rock shaft, links connecting the upper ends of said arms to said shoes, and a pull rod connected to one of said arms for rocking said shaft and thereby elevating said shoes to platform engaging position.

17. In a removable body truck, the combination of a chassis frame, a pair of rail sections hinged at their forward ends to said frame, brackets secured to the outer sides of said rail sections, shoes pivoted between their front and rear ends on said brackets, and a pull rod operatively connected to said shoes for elevating the latter to platform engaging position, said pull rod including an elastic link.

18. In a removable body truck, the combination of a chassis frame, a pair of rail sections hinged at their forward ends to said frame, a transverse member rigidly connecting the rear ends of said rail sections, brackets secured to said rail sections and tranverse member, shoes pivoted between their ends on said brackets, a rock shaft mounted on said transverse member, arms on the ends of said rock shaft, links connecting said arms to said shoes, and a pull rod, including an elastic link, connected to one of said arms.

WILLIAM M. BAXTER.